United States Patent
Shen et al.

(10) Patent No.: US 12,240,937 B2
(45) Date of Patent: *Mar. 4, 2025

(54) METHOD FOR PRODUCING THERMOPLASTICALLY PROCESSABLE POLYURETHANE POLYMERS

(71) Applicant: Covestro Intellectual Property GmbH & Co. KG, Leverkusen (DE)

(72) Inventors: Yi Shen, Dormagen (DE); Franz-Heinrich Hermanns, Grevenbroich (DE); Christian Wamprecht, Neuss (DE); Peter Reichert, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 485 days.

This patent is subject to a terminal disclaimer.

(21) Appl. No.: 17/631,523

(22) PCT Filed: Aug. 4, 2020

(86) PCT No.: PCT/EP2020/071929
§ 371 (c)(1),
(2) Date: Jan. 31, 2022

(87) PCT Pub. No.: WO2021/023750
PCT Pub. Date: Feb. 11, 2021

(65) Prior Publication Data
US 2022/0282022 A1  Sep. 8, 2022

(30) Foreign Application Priority Data
Aug. 7, 2019 (EP) .................................... 19190579

(51) Int. Cl.
| | | |
|---|---|---|
| C08G 18/12 | (2006.01) | |
| C08G 18/32 | (2006.01) | |
| C08G 18/42 | (2006.01) | |
| C08G 18/44 | (2006.01) | |
| C08G 18/48 | (2006.01) | |
| C08G 18/50 | (2006.01) | |
| C08G 18/65 | (2006.01) | |
| C08G 18/66 | (2006.01) | |
| C08G 18/73 | (2006.01) | |
| C08G 18/76 | (2006.01) | |

(52) U.S. Cl.
CPC ......... *C08G 18/12* (2013.01); *C08G 18/3206* (2013.01); *C08G 18/42* (2013.01); *C08G 18/44* (2013.01); *C08G 18/4808* (2013.01); *C08G 18/4825* (2013.01); *C08G 18/4854* (2013.01); *C08G 18/5045* (2013.01); *C08G 18/6511* (2013.01); *C08G 18/664* (2013.01); *C08G 18/6674* (2013.01); *C08G 18/73* (2013.01); *C08G 18/7671* (2013.01)

(58) Field of Classification Search
CPC ...... C08G 8/12; C08G 18/3206; C08G 18/42; C08G 18/44; C08G 18/4808; C08G 18/4825; C08G 18/4854; C08G 18/5045; C08G 18/6511; C08G 18/664; C08G 18/6674; C08G 18/73; C08G 18/7671
See application file for complete search history.

(56) References Cited

U.S. PATENT DOCUMENTS

| | | |
|---|---|---|
| 3,642,964 A | 2/1972 | Karl et al. |
| 3,915,923 A | 10/1975 | Ward |
| 4,980,445 A | 12/1990 | van der Wal et al. |
| 5,795,948 A | 8/1998 | Heidingsfeld et al. |
| 2003/0162932 A1 | 8/2003 | Brauer et al. |
| 2005/0037194 A1 | 2/2005 | Greene et al. |
| 2007/0049719 A1 | 3/2007 | Brauer et al. |
| 2008/0139774 A1 | 6/2008 | Lawrey et al. |
| 2020/0190246 A1* | 6/2020 | Shen ............... C08G 18/282 |

FOREIGN PATENT DOCUMENTS

| | | | |
|---|---|---|---|
| CN | 101875713 A | 11/2010 | |
| CN | 106750159 A | 5/2017 | |
| DE | 1964834 A1 | 7/1971 | |
| DE | 2901774 A1 | 7/1980 | |
| GB | 1057018 A | 2/1967 | |
| WO | WO-2018158327 | * 7/2018 | ............. C08G 18/66 |

OTHER PUBLICATIONS

Kunststoffe 68 (1978), pp. 819 to 825.
Kautschuk, Gummi, Kunststoffe 35 (1982), pp. 568 to 584.
Justus Liebigs Annalen der Chemie, 562, pp. 75-136.
International Search Report, PCT/EP2020/071929, date of mailing: Nov. 3, 2020, Authorized officer: Christian Wohnhaas.

* cited by examiner

Primary Examiner — Michael L Leonard
(74) Attorney, Agent, or Firm — The Webb Law Firm

(57) ABSTRACT

The present invention relates to a novel process for preparing thermoplastically processable polyurethanes, to thermoplastically processable polyurethane obtainable from the process and to compositions, articles and uses of these polyurethanes.

20 Claims, No Drawings

METHOD FOR PRODUCING THERMOPLASTICALLY PROCESSABLE POLYURETHANE POLYMERS

CROSS-REFERENCE TO RELATED APPLICATION

This application is a national stage application under 35 U.S.C. § 371 of PCT/EP2020/071929, filed Aug. 4, 2020, which claims the benefit of European Application No. 19190579.3, filed Aug. 7, 2019, each of which is incorporated herein by reference.

FIELD

The present invention relates to a novel process for preparing thermoplastically processable polyurethanes, to thermoplastically processable polyurethanes obtainable from the process and to compositions, articles and uses of these polyurethanes.

BACKGROUND

Thermoplastically processable polyurethane polymers (TPU) have long been known. They are of great industrial importance due to the combination of high-level mechanical properties with the known advantages of cost-effective thermoplastic processability. The use of different chemical building block components makes it possible to achieve a great breadth of variation in mechanical properties. An overview of TPU, their properties and applications is described for example in Kunststoffe 68 (1978), pages 819 to 825, or Kautschuk, Gummi, Kunststoffe 35 (1982), pages 568 to 584. TPUs are formed from linear polyols, usually polyethers or polyesters, organic diisocyanates and short-chain diols (chain extenders). TPUs can be prepared continuously or batchwise. The best-known industrial production processes which are also in use industrially are the belt process (GB 1057018 A) and the extruder process (DE 1964834 A-1 and DE 2059570 A-1).

To adjust the properties, the building block components can be varied within relatively broad molar ratios. Molar ratios of macrodiols to chain extenders of from 1:1 to 1:12 have proven useful. The hardness of the TPU can be adjusted within a wide range via the amount of chain extender. This results in products in the hardness range from about 40 Shore A to about 85 Shore D.

For the improvement of the processing behavior, in particular the cycle time, of particular interest over the entire hardness range from about 40 Shore A to about 85 Shore D are those TPUs which in injection-molded articles have a very high solidification rate after processing. In particular in the case of hard TPUs and soft TPUs, there are frequently problems with the chemical coupling of the hard and soft segment on account of excessively high differences in polarity between these phases. As a result, the overall potential of the mechanical properties and the processing properties can frequently not be fully exploited. There has been no shortage of attempts to eliminate these disadvantages by specific methods.

A process for preparing thermoplastically processable polyurethanes is described by W. Bräuer et al. (EP-A 1757632). The homogeneity of the TPUs is improved by a multistage OH-prepolymer process. However, the improved homogeneity slows the solidification rate of the TPUs.

A process for preparing soft, readily demoldable thermoplastic polyurethane elastomers having low shrinkage is described by W. Bräuer et al. (EP-A 1338614). By pre-extending the soft segment, the demolding behavior of TPUs between 45 Shore A and 65 Shore A was improved. At very high hardnesses this process has clear disadvantages because incompatibilities between the hard and soft phase arise and hence good coupling between these phases can no longer take place. As a result, the high molecular weight of the TPUs which is required for good mechanical properties is not achieved. In practice, this process is also very unstable as a result of excessively high and fluctuating viscosities of the prepolymer stage and below 60 Shore A no longer functions satisfactorily, meaning extruder downtimes frequently occur.

Further soft thermoplastic polyurethane elastomers, a process for the preparation thereof and use are likewise described by W. Bräuer et al. (EP-A 1932863). Via the combination of different polyester polyols and chain extenders, TPUs having good demoldability were obtained. However, this document does not describe any TPUs based on polyethers. In the case of plasticizer-free TPUs of this process having a hardness of less than 60 Shore A, only a very slow solidification after the processing by injection molding has been achieved to date.

To improve the low-temperature impact strength of polyester-based TPUs for ski boot applications for example, polyether polyols having a molecular weight of greater than 1600 g/mol, for example polytetramethylene ether glycol (U.S. Pat. No. 4,980,445A) and polypropylene diol ether (WO/2018/158327), are used as modifiers. Due to the incompatibility of the hard and soft phases in the TPU, which leads to poor coupling of these phases, such polyethers can be incorporated into TPU harder than 60 Shore D as a pure soft phase only with difficulty. A hard TPU with good low-temperature impact strength is difficult to prepare without a modifier.

SUMMARY

It is accordingly an object of the invention to provide a novel process for preparing TPU which makes it possible to prepare thermoplastic polyurethanes having good processing properties and good mechanical properties over a very broad hardness range from about 40 Shore A to about 85 Shore D.

This object was surprisingly achieved by a solvent-free process for preparing thermoplastically processable polyurethane polymers by reacting the following components:
- (A) one or more essentially linear polyols, wherein the total amount of component (A) has an average molecular weight Mn in the range from 500 g/mol to 5000 g/mol, wherein Mn has been calculated from the OH number determined according to DIN53240,
- (B) one or more organic polyisocyanates, preferably organic diisocyanates,
- (C) one or more linear diols having a molecular weight of 62 g/mol to 500 g/mol,
- (D) optionally in the presence of one or more catalysts,
- (E) optionally in the presence of one or more additives, auxiliaries and/or additions, and
- (F) optionally in the presence of one or more monofunctional chain terminators, characterized in that the process comprises or consists of the following steps:
1) providing and reacting a mixture composed of the total amount of component (A), a subamount of component (B) and optionally a subamount or the total amount of component (D), component (E) and/or component (F)

to afford an NCO-functional prepolymer, wherein in process step 1) a molar ratio of component (B) to component (A) is in the range from 1.1:1.0 to 5.0:1.0, 2) reacting the NCO-functional prepolymer from process step 1) with the total amount of component (C) to obtain an OH-functional prepolymer, optionally in the presence of a further subamount of component (D), component (E) and/or component (F), 3) reacting the OH-functional prepolymer from process step 2) with the remaining amount of component (B) and any remaining amount of component (D), component (E) and/or component (F) to obtain the thermoplastically processable polyurethane, wherein over all process steps a molar ratio of component (B) to the sum of component (A) and component (C) is in the range from 0.9:1.0 to 1.2:1.0.

DETAILED DESCRIPTION

The process according to the invention makes it possible to prepare thermoplastic polyurethanes having good processing properties and good mechanical properties over a hardness range from about 40 Shore A to about 85 Shore D. It is also possible inter alia to provide TPU having a hardness of less than 60 Shore A and exhibiting a rapid solidification rate after injection molding without the use of plasticizers. This process also makes it possible to prepare very hard TPUs up to a hardness of 85 Shore D and to achieve good coupling of the hard and soft phases of the TPU, thus resulting in an optimally high molecular weight and thus in very good mechanical properties of the manufactured workpieces. The process is solvent-free, which contributes to markedly better environmental compatibility in the preparation and use of the polyurethane polymers.

"Solvent-free" in the context of the present invention is understood to mean the reaction of components A, B and C essentially without additional diluents, for example organic solvents or water, meaning that components A, B and C are preferably reacted with one another in undiluted form. Components D, E and/or F may optionally be present in suitable diluents and be added as a solution to components A, B and/or C. In the context of the present invention, the process is still considered to be solvent-free when the solvent content is up to 1% by weight, preferably up to 0.1% by weight, even more preferably up to 0.01% by weight and most preferably 0% by weight, based on the total weight of the reaction mixture. A solvent is understood to mean a substance in which at least one of components A, B and C and optionally D, E and/or F can be dissolved, dispersed, suspended or emulsified, but which does not react with any of components A, B and C and optionally D, E and/or F or with the polymer and the prepolymer(s). Within this context, "essentially" means that the proportion of solvent is at most 10% by weight, preferably at most 5% by weight, particularly preferably at most 1% by weight, even more preferably at most 0.1% by weight, even more preferably still at most 0.01% by weight and most preferably 0% by weight, based on the total weight of the reaction mixture.

The word "a" in the context of the present invention in connection with countable parameters is to be understood as meaning the number "one" only when this is stated explicitly (for instance by the expression "precisely one"). When reference is made hereinbelow for example to "a polyol" the word "a" is to be understood as meaning merely the indefinite article and not the number "one", this therefore also encompasses an embodiment comprising a mixture of at least two polyols.

Within this context, "essentially" means that at least 95 mol %, preferably at least 98 mol %, particularly preferably at least 99 mol % and even more preferably at least 99.5 mol %, even more preferably still at least 99.8 mol % and most preferably 100 mol % of the total amount of the polyols of component A) consist of linear polyols.

According to the invention the terms "comprising" or "containing" preferably mean "consisting essentially of" and particularly preferably mean "consisting of".

The hardness of the thermoplastically processable polyurethanes can be adjusted from 40 Shore A to 85 Shore D by selecting the molar ratio of component A) to component C).

The amounts of the reaction components for the NCO-functional prepolymer formation in step 1) are selected such that the NCO/OH ratio of polyisocyanate to polyol in step 1) is from 1.1:1 to 5.0:1.

The components are intimately mixed and the NCO prepolymer reaction in step 1) is preferably brought to complete conversion (based on the polyol component).

At least component (C) is then mixed in as chain extender (step 2) to afford an OH-functional prepolymer.

Thereafter, in step 3), the remaining amount of component (B) is added, an NCO/OH ratio of from 0.9:1 to 1.2:1 being maintained Preferably, the same component (B) is used in step 3) as in step 1).

In a preferred embodiment of the process according to the invention, in process step 2) the molar ratio of NCO-functional prepolymer to component (C) is less than 1.0. Component (C) is thus present in a molar excess.

The solvent-free process according to the invention may be carried out not only by the manual pouring method but also in a reaction extruder at temperatures of 160° C. to 240° C., preferably 170° C. to 240° C. and particularly preferably at 180° C. to 240° C.

It has proven advantageous to perform the process according to the invention in the presence of nitrogen. This has the advantage that oxidation processes during TPU preparation at high temperatures of for example 180° C. to 240° C. are minimized, with the result that a markedly lower color number of the TPU pellets is obtained. In the manual pouring method it is sufficient to fill the reaction vessel with nitrogen and to apply nitrogen blanketing of 1 to 10 liters of nitrogen per hour during the metered addition of the individual components. In the extruder process it is advantageous to introduce a nitrogen stream into an initial barrel of the extruder, for example barrel 1 to barrel 3. The introduced nitrogen amount is in the range from 10 to 1000 liters per hour, preferably 100 to 750 liters per hour and particularly preferably 100 to 500 liters per hour.

Suitable components (A) include all linear polyols known to those skilled in the art and having an average molecular weight Mn of greater than 500 g/mol. According to the invention the total amount of component A has an average molecular weight Mn in the range from 500 g/mol to 5000 g/mol, wherein Mn has been calculated from the OH number determined according to DIN53240. It is thus possible that some of the polyols have an Mn of greater than 5000 g/mol, provided that the Mn of the total amount of component A is in the range from 500 g/mol to 5000 g/mol. Linear polyols especially suitable as component (A) include:
a) polyester polyols,
b) polyether polyols,
c) polyether esters,
d) polycarbonate polyols,
e) polyether carbonates or any desired mixtures of the polyols a) to e). The molecular weights Mn of such polyols are typically calculated via their OH number (hydroxyl number), as is known to those skilled in the art. The OH number is determined titrimetrically in accordance with DIN 53240. The molar weight of polyols can be calculated from the OH number (OHN) by the following formula:

$$Mn = 1000 \text{ mg/g} \cdot \frac{z \cdot 56.106 \text{ g/Mol}}{OHN[\text{mg/g}]}$$

Here, z is the number of OH groups in the macromolecule, For a linear diol, z=2. For production reasons, these often contain small amounts of nonlinear compounds.

Suitable polyester diols a) can be prepared, for example, from dicarboxylic acids having 2 to 12 carbon atoms, preferably 2 to 6 carbon atoms, and polyhydric alcohols. Examples of useful dicarboxylic acids include: aliphatic dicarboxylic acids such as succinic acid, glutaric acid, adipic acid, suberic acid, azelaic acid and sebacic acid, dodecanedioic acid and aromatic dicarboxylic acids such as phthalic acid, isophthalic acid and terephthalic acid. The dicarboxylic acids may be used individually or as mixtures, for example in the form of a succinic, glutaric and adipic acid mixture. For preparation of the polyester polyols, it may in some cases be advantageous to use, rather than the dicarboxylic acids, the corresponding dicarboxylic acid derivatives such as carboxylic diesters having 1 to 4 carbon atoms in the alcohol radical, carboxylic anhydrides or acyl chlorides. Examples of polyhydric alcohols are glycols having 2 to 12 and preferably 2 to 6 carbon atoms, such as ethylene glycol, diethylene glycol, butane-1,4-diol, pentane-1,5-diol, hexane-1,6-diol, decane-1,10-diol, dodecane-1,12-diol, 2,2-dimethylpropane-1,3-diol, propane-1,3-diol, propane-1,2-diol and dipropylene glycol. Depending on the desired properties, the polyhydric alcohols may be used alone or optionally in a mixture with one another. Furthermore suitable are condensation products of hydroxycarboxylic acids, for example hydroxycaproic acid, and polymerization products of lactones, for example optionally substituted caprolactones. Polyester polyols used with preference are ethanediol polyadipates, butane-1,4-diol polyadipates, hexane-1,6-diol polyadipates, ethanediol butane-1,4-diol polyadipates, hexane-1,6-diol neopentyl glycol polyadipates, hexane-1,6-diol butane-1,4-diol polyadipates and polycaprolactones. The polyester diols have molecular weights Mn in the range from 500 to 5000 g/mol, preferably in the range from 600 to 3500 g/mol and particularly preferably in the range from 800 to 3000 g/mol. They may be used singly or in the form of mixtures with one another.

Suitable polyether diols b) may be prepared by reacting one or more alkylene oxides having 2 to 4 carbon atoms in the alkylene radical with a starter molecule containing two active hydrogen atoms in bonded form. Examples of alkylene oxides include: ethylene oxide, 1,2-propylene oxide, epichlorohydrin and 1,2-butylene oxide and 2,3-butylene oxide. Preference is given to using ethylene oxide, propylene oxide and mixtures of 1,2-propylene oxide and ethylene oxide. The alkylene oxides may be used singly, alternately in succession or as mixtures. Contemplated starter molecules include for example: water, amino alcohols such as N-alkyldiethanolamines, for example N-methyldiethanolamine, and diols such as ethylene glycol, 1,3-propylene glycol, butane-1,4-diol and hexane-1,6-diol. It is also optionally possible to use mixtures of starter molecules. Other suitable polyether diols are the hydroxyl group-containing polymerization products of tetrahydrofuran. It is also possible to use trifunctional polyethers in proportions of 0 to 30% by weight based on the bifunctional polyethers but at most in an amount such that a thermoplastically processable product is formed. Suitable polyether diols have a number-average molecular weight Mn in the range from 500 to 5000 g/mol, preferably 750 to 5000 g/mol and very particularly preferably 900 to 4200 g/mol. They may be used either singly or in the form of mixtures with one another.

Suitable polyether esters c) may be prepared for example by reaction of short-chain polyether diols, for example polytetrahydrofurans having molecular weights Mn in the range from 250 to 1000 g/mol, with organic dicarboxylic acids, for example succinic acid or adipic acid. The polyether ester diols have molecular weights Mn in the range from 600 to 5000 g/mol, preferably 700 to 4000 g/mol and particularly preferably 800 to 3000 g/mol. They may be used singly or in the form of mixtures with one another.

Suitable polycarbonate diols d) may be prepared for example by reaction of short-chain diols, for example butane-1,4-diol or hexane-1,6-diol, with diphenyl carbonate or dimethyl carbonate with the assistance of catalysts and with elimination of phenol or methanol. The polycarbonate diols have a number-average molecular weight Mn in the range from 500 to 5000 g/mol, preferably 750 to 5000 g/mol and particularly preferably 1000 to 4500 g/mol.

Suitable polyether carbonate diols e) can be prepared, for example, by reaction of short-chain polyether diols such as polytetrahydrofurans having molecular weights of 250 to 1000 g/mol with diphenyl or dimethyl carbonate with the assistance of catalysts and with elimination of phenol or methanol. Furthermore, polyether carbonate diols can be prepared by copolymerization of alkylene oxides, e.g. ethylene oxide or propylene oxide or mixtures thereof, with carbon dioxide with the assistance of suitable catalysts, e.g. double metal cyanide catalysts. The polyether carbonate diols have a number-average molecular weight Mn in the range from 500 to 8000 g/mol, preferably 750 to 6000 g/mol and particularly preferably 1000 to 4500 g/mol.

In a further preferred embodiment of the process according to the invention, component (A) employed is one or more polyols selected from the group consisting of polyester diols, polyether diols, polycarbonate diols or a mixture of at least two of these, preferably wherein the one or more polyols each have an average molecular weight Mn in the range of 500 g/mol to 5000 g/mol, wherein Mn has been calculated from the OH number determined according to DIN53240.

In a further preferred embodiment of the process according to the invention, component (A) employed is one or more polyester diols having an average molecular weight Mn in the range from 500 g/mol to 5000 g/mol, preferably in the range from 600 g/mol to 3500 g/mol and particularly preferably in the range from 800 g/mol to 3000 g/mol, wherein Mn has been calculated from the OH number determined according to DIN53240.

In a further preferred embodiment of the process according to the invention, component (A) employed is one or more polycarbonate diols having an average molecular weight Mn in the range from in the range from 500 g/mol to 5000 g/mol, preferably in the range from 750 g/mol to 5000 g/mol and particularly preferably in the range from 1000 g/mol to 4500 g/mol, wherein Mn has been calculated from the OH number determined according to DIN53240.

In a further preferred embodiment of the process according to the invention, component (A) employed is one or more polyether diols having an average molecular weight Mn in the range from 500 g/mol to 5000 g/mol, preferably in the range from 750 g/mol to 5000 g/mol and particularly preferably in the range from 900 g/mol to 4200 g/mol, wherein Mn has been calculated from the OH number determined according to DIN53240.

In a further preferred embodiment of the process according to the invention, the one or more polyether diols are independently of one another polyethers based on a polymer of ethylene oxide or propylene oxide or a mixture of different polymers of these raw materials.

In a further preferred embodiment of the process according to the invention, the one or more polyether diols are independently of one another polyethers based on a polymer of tetrahydrofuran.

Contemplated organic polyisocyanates of component (B) which are employed in steps 1) and 3) include for example aliphatic, cycloaliphatic, araliphatic, heterocyclic and aromatic polyisocyanates, such as are described in Justus Liebigs Annalen der Chemie, 562, p. 75-136.

Specific examples include for example: aliphatic diisocyanates, such as 1,5-pentamethylene diisocyanate, 1,6-hexamethylene diisocyanate and 1,10-decane diisocyanate, cycloaliphatic diisocyanates, such as isophorone diisocyanate, 1,4-cyclohexane diisocyanate, 1-methyl-2,4-cyclohexane diisocyanate and 1-methyl-2,6-cyclohexane diisocyanate and also the corresponding isomer mixtures, 4,4'-dicyclohexylmethane diisocyanate, 2,4'-dicyclohexylmethane diisocyanate and 2,2'-dicyclohexylmethane diisocyanate and also the corresponding isomer mixtures, aromatic diisocyanates, such as 2,4-tolylene diisocyanate, mixtures of 2,4-tolylene diisocyanate and 2,6-tolylene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates and 2,4'-diphenylmethane diisocyanates, 4,4'-diisocyanato-1,2-diphenylethane and 1,5-naphthylene diisocyanate. Preferably employed are 1,6-hexamethylene diisocyanate, isophorone diisocyanate, 4,4'-dicyclohexylmethane diisocyanate, diphenylmethane diisocyanate isomer mixtures having a 4,4'-diphenylmethane diisocyanate content of >96% by weight and especially 4,4'-diphenylmethane diisocyanate and 1,5-naphthylene diisocyanate. These diisocyanates may be used singly or in the form of mixtures with one another. They may also be used together with up to 15% by weight (based on the total amount of diisocyanate) of a polyisocyanate, for example triphenylmethane 4,4',4''-triisocyanate or polyphenylpolymethylene polyisocyanates.

In a further preferred embodiment of the process according to the invention, component (B) employed is a diphenylmethane diisocyanate isomer mixture having a 4,4'-diphenylmethane diisocyanate content of more than 96% by weight based on the total weight of component (B), component (B) employed is preferably 4,4'-diphenylmethane diisocyanate.

In a further preferred embodiment of the process according to the invention, component (B) employed is 1,6-hexamethylene diisocyanate.

Suitable components (C) (chain extender) are all linear diols known to those skilled in the art and having a molecular weight of 62 g/mol to 500 g/mol. The diols and/or the precursor compounds thereof may have been obtained from fossil or biological sources. Suitable diols are preferably aliphatic diols having 2 to 14 carbon atoms, such as for example ethanediol, butane-1,4-diol, hexane-1,6-diol, octane-1,8-diol, decane-1,10-diol, dodecane-1,12-diol, diethylene glycol and dipropylene glycol. However, also suitable are diesters of terephthalic acid with glycols having 2 to 4 carbon atoms, such as for example terephthalic acid bis-ethylene glycol or terephthalic acid bis-butane-1,4-diol, hydroxyalkylene ethers of hydroquinone, such as for example 1,4-di(hydroxyethyl)hydroquinone and ethoxylated bisphenols. Particular preference is given to using ethanediol, butane-1,4-diol, hexane-1,6-diol and 1,4-di(hydroxyethyl)hydroquinone as short-chain diols. Mixtures of the abovementioned chain extenders may also be used. It is also possible to add small quantities of diamines and/or triols.

In a further preferred embodiment of the process according to the invention, component (C) employed is one or more diols selected from the group consisting of ethane-1,2-diol, butane-1,4-diol, hexane-1,6-diol, 1,4-di(beta-hydroxyethyl)hydroquinone or a mixture of at least two of these, component (C) employed is preferably ethane-1,2-diol, butane-1,4-diol or mixtures thereof and component (C) employed is particularly preferably ethane-1,2-diol.

Catalysts (D) that may be used include the customary catalysts known from polyurethane chemistry. Suitable catalysts are the customary tertiary amines known per se, for example triethylamine, dimethylcyclohexylamine, N-methylmorpholine, N,N'-dimethylpiperazine, 2-(dimethylaminoethoxy)ethanol, diazabicyclo[2.2.2]octane and the like, and also in particular organic metal compounds such as titanic esters, iron compounds, bismuth compounds, zirconium compounds, tin compounds, for example tin diacetate, tin dioctoate, tin dilaurate or the dialkyltin salts of aliphatic carboxylic acids such as dibutyltin diacetate, dibutyltin dilaurate or the like. Preferred catalysts are organic metal compounds, in particular titanic esters, iron compounds or tin compounds. Very particular preference is given to dibutyltin dilaurate, tin dioctoate and titanic esters.

Additives, auxiliaries and additions (E) that may be used are for example lubricants, such as fatty acid esters, metal soaps thereof, fatty acid amides and silicone compounds, antiblocking agents, inhibitors, stabilizers against hydrolysis, light, heat and discoloration, flame retardants, dyes, pigments, inorganic or organic fillers, nucleating agents and reinforcers. Reinforcers are especially fibrous reinforcing materials such as inorganic fibers, which are prepared according to the prior art and may also be sized. Further information about the recited auxiliary and additive substances may be found in the specialist literature, for example J. H. Saunders, K. C. Frisch: "High Polymers", volume XVI, Polyurethane, part 1 and 2, Interscience Publishers 1962 and 1964, R. Gächter, H. Müller (Ed.): Taschenbuch der Kunststoff-Additive [Handbook of Plastics Additives], 3rd edition, Hanser Verlag, Munich 1989, or DE-A 29 01 774.

Monofunctional chain terminators (F) which may be used include monoalcohols, such as for example 1-butanol, 1-hexanol, 1-octanol and stearyl alcohol, or monoamines, such as for example 1-butylamine, di-n-butylamine and stearylamine, to set a particular TPU molecular weight.

In a further preferred embodiment of the process according to the invention, the thermoplastically processable polyurethane polymer has a hardness of less than 60 Shore A or greater than 80 Shore D, preferably in the range from 35 Shore A to 60 Shore A or in the range from 70 Shore D to 95 Shore D, particularly preferably in the range from 40 Shore A to 55 Shore A or in the range from 75 shore D to 90 shore D, in each case determined according to DIN ISO 7619-1 (2012 Feb. 1).

In a further preferred embodiment of the process according to the invention, the thermoplastically processable polyurethane polymer has a hardness of less than 60 Shore A, preferably in the range from 35 Shore A to 60 Shore A, particularly preferably in the range from 40 Shore A to 55 Shore A, in each case determined according to DIN ISO 7619-1 (2012 Feb. 1).

In a further preferred embodiment of the process according to the invention, the thermoplastically processable polyurethane polymer has a hardness of greater than 70 Shore D, preferably in the range from 70 Shore D to 95 Shore D, particularly preferably in the range from 75 Shore D to 90 Shore D, in each case determined according to DIN ISO 7619-1 (2012 Feb. 1).

The TPU from the process according to the invention having a hardness of 40 Shore A to 60 Shore A are particularly preferably prepared from the following main components:

Component (A):
- i) butane-1,4-diol polyadipates, hexane-1,6-diol polyadipates, ethanediol butane-1,4-diol polyadipates, hexane-1,6-diol neopentyl glycol polyadipates, hexane-1,6-diol butane-1,4-diol polyadipates and mixtures thereof having molecular weights Mn of 500 to 5000 g/mol, wherein Mn has been calculated from the OH number determined according to DIN53240, or
- ii) polypropylene oxides or polyethylene/polypropylene oxides and/or polymers of tetrahydrofuran and mixtures of these having molecular weights Mn of 500 to 5000 g/mol, wherein Mn has been calculated from the OH number determined according to DIN53240, Component (B):
- iii) diphenylmethane 4,4'-diisocyanate, dicyclohexylmethane 4,4'-diisocyanate and/or hexamethylene 1,6-diisocyanate, Component (C):
- iv) ethanediol, butane-1,4-diol, hexane-1,6-diol and/or 1,4-di(hydroxyethyl)hydroquinone,
  wherein mixtures of the components within i) to iv) and also between i) and ii) may also be used, wherein the Shore hardness has in each case been determined according to DIN ISO 7619-1 (2012 Feb. 1).

The thermoplastically processable polyurethane polymers may be prepared batchwise (manual casting process) or continuously using the process according to the invention. The best-known industrial manufacturing processes for preparing TPU are the belt process (GB-A 1 057018) and the extruder process (DE-A 1 964 834, DE-A2 059570 and U.S. Pat. No. 5,795,948). The known mixing aggregates, preferably those operating with high shear energy, are suitable for preparing the thermoplastically processable polyurethane polymers. For continuous preparation, mention may be made by way of example of co-kneaders, preferably extruders, such as for example twin-screw extruders and Buss kneaders.

The thermoplastically processable polyurethane polymers may be prepared for example in a twin-screw extruder by preparing the prepolymer in the first section of the extruder followed by chain extension and polyisocyanate addition in the second section. According to the invention, the metered addition of the chain extender (component (C)) has to be effected prior to the metered addition of the further polyisocyanate. The chain extender and polyisocyanate must not be added in parallel into the same metering opening of the extruder.

However, the NCO and OH prepolymer may also be prepared outside of the extruder in a separate upstream prepolymer reactor, batchwise in a tank or continuously in a tube with static mixers or a stirred tube (tubular mixer).

However, an OH prepolymer prepared in a separate prepolymer reactor may also be mixed with the diisocyanate by means of a first mixing apparatus, for example a static mixer, and with the remaining amounts of polyisocyanates by means of a second mixing apparatus, for example a mixing head. Analogously to the known belt process, this reaction mixture is subsequently continuously applied to a carrier, for example a conveyor belt, where it is allowed to react until solidification of the material, possibly with heating of the belt, to afford the TPU.

In a preferred embodiment, the process is conducted at a reaction temperature in the range from 140° C. to 240° C. In a further preferred embodiment, the process is conducted in an extruder at a reaction temperature in the range from 140° C. to 240° C.

The invention further provides a thermoplastically processable polyurethane polymer obtainable or obtained by the process according to the invention. The polyurethane polymers prepared with the process according to the invention have better properties than those prepared by the processes known from the prior art. In particular, the polyurethane polymers according to the invention cure more rapidly and have a higher Shore hardness and an improved tensile strength.

The invention further provides a thermoplastically processable polyurethane polymer having a Charpy impact strength of $\geq 15$ KJ/m$^2$ at $-30°$ C. determined according to DIN EN ISO179/1eA, obtainable or obtained by reacting the components (A) one or more essentially linear polyether diols based on a polymer of tetrahydrofuran, wherein the total amount of component (A) has an average molecular weight Mn of greater than 1450 g/mol, preferably an average molecular weight Mn in the range from 1450 g/mol to 3500 g/mol, particularly preferably an average molecular weight Mn in the range from 1450 g/mol to 3000 g/mol, yet more preferably an average molecular weight Mn in the range from 1500 g/mol to 3000 g/mol, wherein Mn has been calculated from the OH number determined according to DIN53240, (B) one or more organic polyisocyanates, preferably organic diisocyanates, (C) one or more linear diols having a molecular weight of 62 g/mol to 500 g/mol, (D) optionally in the presence of one or more catalysts, (E) optionally in the presence of one or more additives, auxiliaries and/or additions, and (F) optionally in the presence of one or more monofunctional chain terminators, characterized in that the reaction of the components is effected in a solvent-free fashion and comprises or consists of the following steps:

1) providing and reacting a mixture composed of the total amount of component (A), a subamount of component (B) and optionally a subamount or the total amount of component (D), component (E) and/or component (F) to afford an NCO-functional prepolymer, wherein in process step 1) a molar ratio of component (B) to component (A) is in the range from 1.1:1.0 to 5.0:1.0, 2) reacting the NCO-functional prepolymer from process step 1) with the total amount of component (C) to obtain an OH-functional prepolymer, optionally in the presence of a further subamount of component (D), component (E) and/or component (F), 3) reacting the OH-functional prepolymer with the remaining amount of component (B) and any remaining amount of component (D), component (E) and/or component (F) to obtain the thermoplastically processable polyurethane, wherein over all process steps a molar ratio of component (B) to the sum of component (A) and component (C) is in the range from 0.9:1.0 to 1.2:1.0, preferably over all process steps a molar ratio of component (B) to the sum of component (A) and component (C) is in the range from 0.95:1.0 to 1.1:1.0.

In a preferred embodiment of the thermoplastically processable polyurethane polymer according to the invention, said polymer has a Charpy impact strength of at least 30 KJ/m$^2$, preferably of at least 70 KJ/m$^2$, determined according to DIN EN ISO179/1eA (2010) at −30° C.

The invention further provides a composition containing at least one thermoplastically processable polyurethane polymer according to the invention or a thermoplastically processable polyurethane polymer according to the invention having a Charpy impact strength of ≥15 KJ/m$^2$ at −30° C. determined according to DIN EN ISO179/1eA and an additive.

The invention further provides an article comprising or containing a thermoplastically processable polyurethane polymer according to the invention or a thermoplastically processable polyurethane polymer according to the invention having a Charpy impact strength of ≥15 KJ/m$^2$ at −30° C. determined according to DIN EN ISO179/1eA or a composition according to the invention.

The invention further provides for the use of a thermoplastically processable polyurethane polymer according to the invention or of a thermoplastically processable polyurethane polymer according to the invention having a Charpy impact strength of ≥15 KJ/m$^2$ at −30° C. determined according to DIN EN ISO179/1eA or of a composition according to the invention for production of injection molded articles, extruded articles and coatings. Extruded articles include for example films, sheets or hoses.

The invention shall be more particularly elucidated by reference to the examples which follow.

Test Methods:
Tensile Test:
Measurements in the tensile test in accordance with ISO 53504 (2009-10) at a pulling rate of 200 mm/min.

Shore Hardness:
The Shore hardness was measured in accordance with DIN ISO 7619-1 (2012 Feb. 1).

Solidification Rate (Hardness at 0 s/60 s)
To determine the solidification rate, the development of hardness of round moldings (diameter 30 mm, height 6 mm) was measured after processing by injection molding (injection molding machine settings: 25 s cooling time and 25 s pressure dwell time). Here, the hardness of the test specimens was measured in accordance with DIN 7619-1 (2012 Feb. 1) immediately after removal from the mould (0 s) and after 60 s.

Charpy Impact Strength Testing
Charpy impact strength tests were carried out on the injection molded test specimens according to DIN EN ISO179/1eA: (2010) at −30° C. The test specimen has the following dimensions: 80±2 mm length, 10.0±0.2 mm breadth and 4.0±0.2 mm thickness. The test specimen is notched. The notch base radius $r_N$ is 0.25±0.05 mm Solution Viscosity:
The TPU specimen is dissolved in a 0.4% solution of N-methylpyrrolidone +0.1% dibutylamine at room temperature with stirring. At the same time, what is known as a blank sample, consisting of N-methylpyrrolidone and 0.1% dibutylamine solution but without the TPU, is also prepared. The solutions are left to stand overnight and measured the next day. The solutions were briefly stirred once more and subsequently measured at 25° C. using an SVM3000/G2 Stabinger viscometer. The kinematic viscosity of the blank value and of the solutions is measured.

Raw Materials Used:
Polyol 1=Desmophen® 2028 (commercial product from Covestro Deutschland AG, polyester, molecular weight Mn about 2000 g/mol)

Polyol 2=Acclaim®2200N (commercial product from Covestro Deutschland AG, polypropylene diol ether, molecular weight Mn about 2000 g/mol)

Polyol 3=Terathane®1000 (commercial product from Invista: Polytetramethylene glycol; molecular weight Mn about 1000 g/mol)

Polyol 4=Terathane®2000 (commercial product from Invista: Polytetramethylene glycol; molecular weight Mn about 2000 g/mol Polyol 5=Desmophen® C2202 (commercial product from Covestro Deutschland AG, polycarbonate diol, molecular weight Mn about 2000 g/mol)

Polyol 6=Terathane®1450 (commercial product from Invista: Polytetramethyl glycol; molecular weight Mn about 1400 g/mol)

Polyol 7=Terathane® 2900 (commercial product from Invista, polytetramethyl glycol, molecular weight Mn about 2900 g/mol)

BDO=butane-1,4-diol (BDO, purity ≥99% by weight) was sourced from Ashland.

MEG=ethane-1,2-diol (MEG, purity ≥99% by weight) was sourced from OQEMA AG.

MDI=diphenylmethane 4,4'-diisocyanate (MDI, purity ≥99% by weight) was sourced from Covestro AG.

HDI=hexamethylene 1,6-diisocyanate (HDI, purity ≥99% by weight) was sourced from Covestro AG.

Irganox® 1010 was sourced from BASF SE (DE).

2-Butanone (purity ≥99.5%) was sourced from Merck KGaA (DE).

Tyzor® AA105 was sourced from Dorf Ketal (US).

Polyether LP 112 was sourced from Covestro AG (polypropylene diol ether, molecular weight Mn about 1000 g/mol).

Examples

Table 1 illustrates the invention on the basis of a few examples. The preparation processes used are described hereinbelow.

Process 1*: Soft Segment Pre-Extension (in Accordance with EP-A 1338614), Not According to the Invention Step 1: Subamount 1 of the MDI is reacted with 1 mol of polyol or polyol mixture with stirring at about 140° C. up to a conversion >90 mol % based on the polyol.

Step 2: Subamount 2 of the MDI and subsequently the chain extender are added to the stirred reaction mixture and after vigorous mixing (about 20 s) the reaction mixture is poured onto a metal sheet and subsequently heat treated for 30 minutes at 120° C.

Process 2*: One-Shot Process with HDI as the Diisocyanate, Noninventive

Step 1: 1 mol of polyol or polyol mixture is initially charged together with the chain extender and heated to a reaction temperature of about 120° C. The total amount of HDI is then added. After vigorous mixing (about 60s) the reaction mixture is poured onto a metal sheet and subsequently heat-treated at 80° C. for 30 minutes.

Process 3: Inventive MDI Multistage Pre-Extension Process
  Step 1: Subamount 1 of the MDI is reacted with 1 mol of polyol or polyol mixture with stirring at about 140° C. up to a conversion >90 mol % based on the polyol.
  Step 2: The chain extender is added to the stirred reaction mixture and this is stirred vigorously for about 10 s.
  Step 3: Subamount 2 of the MDI is added to the stirred reaction mixture. The reaction mixture is stirred for a further 20 s, subsequently poured onto a metal sheet and heat-treated at 120° C. for 30 minutes.

Process 4: Inventive HDI Multistage Pre-Extension Process
  Step 1: Subamount 1 of the HDI is reacted with 1 mol of polyol or polyol mixture with stirring at about 160° C. up to a conversion >90 mol % based on the polyol.
  Step 2: The chain extender is added to the stirred reaction mixture and this is stirred vigorously for about 60 s.
  Step 3: Subamount 2 of the HDI is added to the stirred reaction mixture. The reaction mixture is stirred for a further 20 s, subsequently poured onto a metal sheet and heat-treated at 80° C. for 30 minutes.

The obtained TPU cast sheets were chopped and pelletized. The pellets were processed using an Arburg Allrounder 470S injection-molding machine in a temperature range from 180° to 230° C. and in a pressure range from 650 to 750 bar at an injection rate of from 10 to 35 cm$^3$/s to give bars (mold temperature: 40° C.; bar size: 80×10×4 mm) or sheets (mold temperature: 40° C.; size: 125×50×2 mm).

The mechanical values (100% modulus, 300% modulus, breaking strength, elongation at break and Shore A/D hardness) and the solidification rate of the prepared TPU products were determined.

TABLE 1

Examples 1-18: Measured results of soft to hard TPUs

| Experiment number | Process | Polyol | Chain extender | MDI/HDI subamount 1 [mol] | MDI/HDI subamount 2 [mol] | Theoretical hardness[#] | Hardness [Shore] | 100% modulus [MPa] | Tensile strength [MPa] | Hardness at 0 s/60 s [Shore A] |
|---|---|---|---|---|---|---|---|---|---|---|
| 1 | 1* | 1 | BDO | 1.25 | 1.011 | 16 | 65A | 2.3 | 36 | 27/39 |
| 2 | 3 | 1 | MEG | 1.5 | 0.875 | 16 | 64A | 2.2 | 31.6 | 45/52 |
| 3 | 1* | 2 | MEG | 1.5 | 0.539 | 12 | 42A | 2.4 | 15.3 | 19/25 |
| 4 | 3 | 2 | MEG | 1.5 | 0.539 | 12 | 47A | 1.5 | 15.1 | 26/33 |
| 5 | 3 | 2 | MEG | 1.5 | 1.642 | 22.4 | 60A | 4.3 | 14.4 | 39/43 |
| 6 | 1* | 2 | MEG | 1.3 | 0.739 | 12 | 40A | 1.1 | 9.8 | 11/18 |
| 7 | 3 | 2 | MEG | 1.3 | 0.739 | 12 | 49A | 1.9 | 11.8 | 30/34 |
| 8 | 3 | 2 | MEG | 2 | 0.373 | 16 | 55A | 2.1 | 12 | 35/48 |
| 9 | 3 | 2 | BDO | 2 | 0.255 | 16 | 59A | 1.6 | 14.9 | 20/45 |
| 10 | 1* | 3 + 4 | BDO | 1.5 | 3.66 | 47.4 | ** | ** | ** | ** |
| 11 | 3 | 3 + 4 | BDO | 1.5 | 3.66 | 47.4 | 52D | 22 | 30 | 78/88 |
| 12 | 1* | 3 + 4 | BDO | 4 | 21.829 | 78.4 | ** | ** | ** | ** |
| 13 | 3 | 3 + 4 | BDO | 4 | 21.829 | 78.4 | 73D | 49.4 | 58.3 | — |
| 14 | 1* | 5 | BDO | 4 | 14.029 | 72 | ** | ** | ** | ** |
| 15 | 3 | 5 | BDO | 4 | 14.029 | 72 | 81D | 50 | 69.1 | — |
| 16 | 2* | 5 | BDO | 3.1*** | — | 20.1 | 87A | 9.2 | 26.9 | 55/76 |
| 17 | 4 | 5 | BDO | 1.1 | 2.0 | 20.1 | 89A | 8.9 | 28.7 | 79/84 |
| 18 | 4 | 5 | BDO | 1.7 | 1.4 | 20.1 | 88A | 12 | 24.6 | 75/81 |

*noninventive comparative example,
** unable to be processed
***total HDI amount (one shot process),
[#]theoretical hardness is the proportion of hard segments in the TPU: e.g. TH = n(BDO + MDI)/(n(BDO + MDI) + m(Polyol + MDI))

In the examples recited in table 1 (experiments 3, 4, 6, 7, 16, 17 and 18) in which identical raw materials were prepared by different processes at identical theoretical hardness it is clearly apparent that the TPU materials prepared by the multistage process according to the invention (processes 3 and 4) solidify much more rapidly, i.e. the measured hardness after 0 seconds and also after 60 seconds after removal from the injection molding machine is higher than in the respective comparative experiments. In tests 1, 2, 8 and 9 (very soft, both polyester-based TPU and polyether-based TPU) it is clearly apparent that the TPUs based on monoethylamine glycol (MEG) solidify faster than those based on butane-1,4-diol (BDO). Hard and very hard TPU materials which are not preparable with the noninventive process 1 (experiments 10 and 12) are readily preparable with the inventive process 3 (experiments 11, 13 and 15).

TABLE 2

Examples 19-26: Improving Charpy impact strength with the process according to the invention

| | Process | Polyols | Mixing ratio of polyols [% by wt.] | Average molar weight of the polyol | Chain extenders | MDI subamount 1 [Mol] | MDI subamount 2 [Mol] | Theoretical hardness# | Charpy impact strength test (−30° C.) [KJ/m$^2$] |
|---|---|---|---|---|---|---|---|---|---|
| 19 | 1* | 4/3 | 50/50 | 1342 | BDO | 4 | 3.562 | 58.2 | 10s+) |
| 20 | 3 | 4/3 | 50/50 | 1342 | BDO | 4 | 3.562 | 58.2 | 21.64s+) |
| 21 | 3 | 6 | 100 | 1400 | BDO | 4 | 3.797 | 58.2 | 18.2s) |
| 22 | 3 | 4/3 | 70/30 | 1560 | BDO | 4 | 4.421 | 58.2 | 91.22z+) |
| 23 | 1* | 4 | 100 | 2078 | BDO | 4 | 6.598 | 58.2 | ** |
| 24 | 3 | 4 | 100 | 2078 | BDO | 4 | 6.598 | 58.2 | 102.16z+) |
| 25 | 1* | 7 | 100 | 2900 | BDO | 4 | 9.704 | 58.2 | ** |
| 26 | 3 | 7 | 100 | 2900 | BDO | 4 | 9.704 | 58.2 | 96.35z+) |

+)fracture type: s = brittle and z = tough
*noninventive comparative example
** unable to be processed
theoretical hardness is the proportion of hard segments in the TPU. TH = n(BDO + MDI)/(n(BDO + MDI) + m(polyol + MDI))

In the recited examples of table 2 it is clearly apparent that in the TPU according to inventive process 3 the low temperature impact strength improves with increasing molecular weight of the polyol. The TPU material is no longer brittle at −30° C. when the average molecular weight of the polyol is greater than 1450 g/mol. Preparing the respective TPU by noninventive process 1 does not afford a suitable TPU material. Either the low-temperature impact strength is poor (experiment 19)/poorer than in the process according to the invention (experiment 20) or the TPU are not processable (experiments 23 and 25).

Comparative Examples with Addition of Solvent

In comparative examples 8A and 24A the polyols employed were Acclaim® Polyether 2200N (polyol 2) and Terathane® T2000 (polyol 4) and the experimental procedure in U.S. Pat. No. 3,915,923 was followed. The resulting products were then compared with examples 8 and 24 (both prepared according to inventive process 3). Identical theoretical hardnesses were adjusted in each case.

Experiment 8A:
260 g of Acclaim® 2200N (OH number 56.1, corresponding to 1 mol) and 1.3 g of Irganox® 1010 are dissolved in 650.03 g of 2-butanone at 56° C. under nitrogen. 64.79 g (2 mol) of MDI are then metered in slowly. This is followed by the addition of 0.69 g of Tyzor AA105 (0.5% solution in Polyether LP 112, corresponding to 10 ppm). The reaction mixture is stirred for about 30 min and the temperature should be maintained at 60° C. Thereafter, 11.05 g (1.373 mol) of monoethylene glycol (MEG) are slowly added dropwise to the reaction mixture, and the mixture is stirred for a further 30-60 min at 60° C. Finally, 12.13 g (0.373 mol) of MDI are metered in at 60° C. and the mixture is stirred further at 60° C. until the NCO content no longer changes and hence a complete conversion can be assumed. Thereafter, the solvent 2-butanone is removed as far as possible by vacuum distillation.

Experiment 24A:
58.89 g of Terathane 2000 (OH number 54, corresponding to 1 mol) and 0.28 g of Irganox 1010 are dissolved in 294.44 g of 2-butanone at 56° C. under nitrogen. 27.48 g (4 mol) of MDI are then metered in slowly. The reaction mixture is stirred for approximately 30 min and the temperature should be maintained at 60° C. 23.56 g (9.524 mol) of butane-1,4-diol (BDO) are then slowly added dropwise to the reaction mixture and the mixture is stirred for a further 30-60 min at 60° C. Finally, 45.34 g (6.598 mol) of MDI are metered in at 60° C. and the mixture is stirred further at 60° C. until the NCO content no longer changes and hence a complete conversion can be assumed. Thereafter, the solvent 2-butanone is removed as completely as possible by vacuum distillation.

TABLE 3

Results of comparative examples 8A and 24A versus inventive examples 8 and 24

| Experiment number | Process | Polyol | Chain Extender | MDI subamount 1 [mol] | MDI subamount 2 [mol] | Theoretical hardness | Solution viscosity | Tensile strength [MPa] |
|---|---|---|---|---|---|---|---|---|
| 8 | 3 | 2 | MEG | 2 | 0.373 | 16 | 1.333 | 12 |
| 8A | According to U.S. Pat. No. 3,915,923 | 2 | MEG | 2 | 0.373 | 16 | 1.054 | Processing not possible |
| 24A | According to U.S. Pat. No. 3,915,923 | 4 | BDO | 4 | 6.598 | 58.2 | 1.138 | Processing not possible |
| 24 | 3 | 4 | BDO | 4 | 6.598 | 58.2 | 1.500 | 40.8 |

Experiments 8A and 24A were prepared according to the process of U.S. Pat. No. 3,915,923 After addition of the chain extender, the mixture had to be stirred for 3 hours in order to obtain complete conversion/until a constant NCO content. After distilling off the solvent, the reaction mixtures were still highly viscous and not solid at room temperature. Compared to the reaction times of the inventive process (not more than 3 min) the reaction times were very long. Due to the very low solution viscosities corresponding to a low molecular weight and the plasticity at room temperature, both products were unable to be thermoplastically processed in an injection molding machine for further mechanical measurements. The processes with addition of solvent cannot be used economically in a TPU production since the solvent would require complete removal after reaction and this is extremely costly and inconvenient.

The invention claimed is:

1. A solvent-free process for preparing thermoplastically processable polyurethane polymers by reacting the following components
   (A) one or more essentially linear polyols, wherein a total amount of component (A) has an average molecular weight Mn in a range from 500 g/mol to 5000 g/mol, wherein Mn is calculated from the OH number determined according to DIN53240;
   (B) one or more organic polyisocyanates;
   (C) one or more linear diols having a molecular weight of 62 g/mol to 500 g/mol;
   (D) optionally in the presence of one or more catalysts;
   (E) optionally in the presence of additives, auxiliaries, additions, or a combination thereof; and
   (F) optionally in the presence of one or more monofunctional chain terminators,
   wherein the process comprises:
   1) Providing and reacting a mixture comprising the total amount of component (A), a subamount of component (B), and optionally a subamount or a total amount of component (D), component (E), component (F), or a combination thereof to afford an NCO-functional prepolymer, wherein in process step 1) a molar ratio of component (B) to component (A) is in a range from 1.1:1.0 to 5.0:1.0;
   2) Reacting the NCO-functional prepolymer from process step 1) with a total amount of component (C) to obtain an OH-functional prepolymer, optionally in the presence of a further subamount of component (D), component (E), component (F), or a combination thereof; and
   3) Reacting the OH-functional prepolymer from process step 2) with a remaining amount of component (B) and any remaining amount of component (D), component (E), component (F), or a combination thereof to obtain the thermoplastically processable polyurethane, wherein over all process steps a molar ratio of component (B) to a sum of component (A) and component (C) is in a range from 0.9:1.0 to 1.2:1.0.

2. The process as claimed in claim 1, wherein in process step 2) a molar ratio of NCO-functional prepolymer to component (C) is less than 1.0.

3. The process as claimed in claim 1, wherein component (A) comprises one or more polyols comprising a polyester diol, a polyether diol, a polycarbonate diol, or a mixture of at least two of these.

4. The process as claimed in claim 1, wherein component (A) comprises one or more polyester diols having an average molecular weight Mn in the range from 500 g/mol to 5000 g/mol, wherein Mn is calculated from the OH number determined according to DIN53240.

5. The process as claimed in claim 1, wherein component (A) comprises one or more polycarbonate diols having an average molecular weight Mn in the range from in the range from 500 g/mol to 5000 g/mol, wherein Mn is calculated from the OH number determined according to DIN53240.

6. The process as claimed in claim 1, wherein component (A) comprises one or more polyether diols having an average molecular weight in the range from 500 g/mol to 5000 g/mol, wherein Mn is calculated from the OH number determined according to DIN53240.

7. The process as claimed in claim 6, wherein the one or more polyether diols are independently of one another polyethers based on a polymer of ethylene oxide or propylene oxide or a mixture of different polymers of these raw materials.

8. The process as claimed in claim 6, wherein the one or more polyether diols are independently of one another polyethers based on a polymer of tetrahydrofuran.

9. The process as claimed in claim 1, wherein component (B) comprises a diphenylmethane diisocyanate isomer mixture having a 4,4'-diphenylmethane diisocyanate content of more than 96% by weight based on the total weight of component (B).

10. The process as claimed in claim 1, wherein component (B) comprises 1,6-hexamethylene diisocyanate.

11. The process as claimed in claim 1, wherein component (C) comprises one or more diols comprising ethane-1,2-diol, butane-1,4-diol, hexane-1,6-diol, 1,4-di(beta-hydroxyethyl) hydroquinone, or a mixture of at least two of these.

12. The process as claimed in claim 1, wherein the thermoplastically processable polyurethane polymer has a hardness of less than 60 Shore A or greater than 80 Shore D, in each case determined according to DIN ISO 7619-1 (2012 Feb. 1).

13. A thermoplastically processable polyurethane polymer obtained by a process as claimed in claim 1.

14. A thermoplastically processable polyurethane polymer having a Charpy impact strength of ≥15 KJ/m$^2$ at −30° C. determined according to DIN EN ISO179/1eA, obtained by reacting the following components
   (A) one or more essentially linear polyether diols based on a polymer of tetrahydrofuran, wherein a total amount of component (A) has an average molecular weight Mn of greater than 1450 g/mol, wherein Mn is calculated from the OH number determined according to DIN53240;
   (B) one or more organic polyisocyanates;
   (C) one or more linear diols having a molecular weight of 62 g/mol to 500 g/mol;
   (D) optionally in the presence of one or more catalysts;
   (E) optionally in the presence of one or more additives, auxiliaries, additions, or a combination thereof; and
   (F) optionally in the presence of one or more monofunctional chain terminators,
   wherein the reaction of the components is performed in a solvent-free fashion and comprises the following steps:
   1) Providing and reacting a mixture comprising the total amount of component (A), a subamount of component (B), and optionally a subamount or a total amount of component (D), component (E), component (F), or a combination thereof to afford an NCO-functional prepolymer, wherein in process step 1) a molar ratio of component (B) to component (A) is in the range from 1.1:1.0 to 5.0:1.0;
   2) Reacting the NCO-functional prepolymer from process step 1) with a total amount of component (C) to obtain an OH-functional prepolymer, optionally in the presence of a further subamount of component (D), component (E), component (F), or a combination thereof; and
   3) Reacting the OH-functional prepolymer from process step 2) with a remaining amount of component (B) and any remaining amount of component (D), component (E), component (F), or a combination thereof to obtain the thermoplastically processable polyurethane, wherein over all process steps a molar ratio of component (B) to a sum of component (A) and component (C) is in a range from 0.9:1.0 to 1.2:1.0.

15. The thermoplastically processable polyurethane polymer as claimed in claim 14, wherein the thermoplastically processable polyurethane polymer has a Charpy impact strength of at least 30 KJ/m², determined according to DIN EN ISO179/1eA (2010) at −30° C.

16. A composition containing at least one thermoplastically processable polyurethane polymer as claimed in claim 13 and an additive.

17. An article comprising a thermoplastically processable polyurethane polymer as claimed in claim 13.

18. An injection molded article, extruded article, or coating, comprising a thermoplastically processable polyurethane polymer as claimed in claim 13.

19. A composition containing a thermoplastically processable polyurethane polymer as claimed in claim 14 and an additive.

20. An article comprising a thermoplastically processable polyurethane polymer as claimed in claim 14.

* * * * *